2,857,011

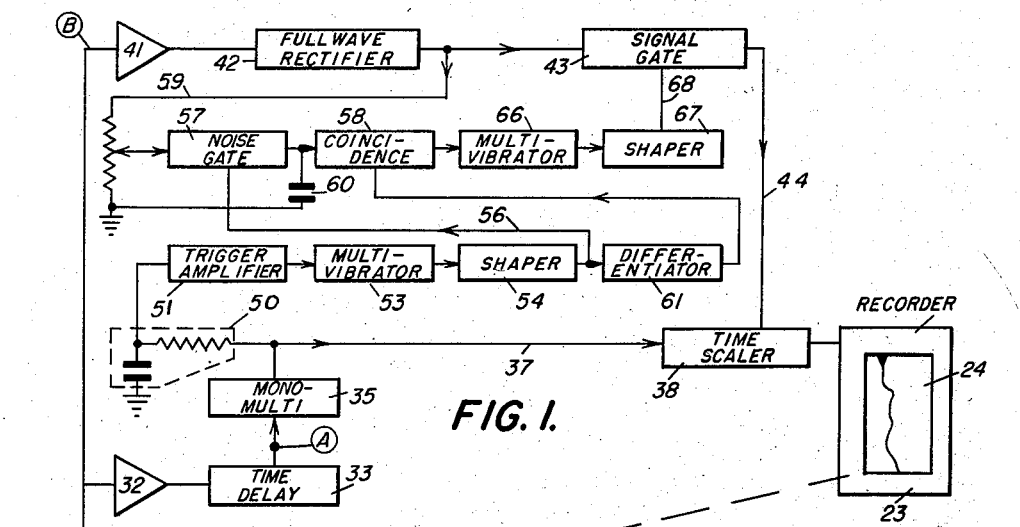
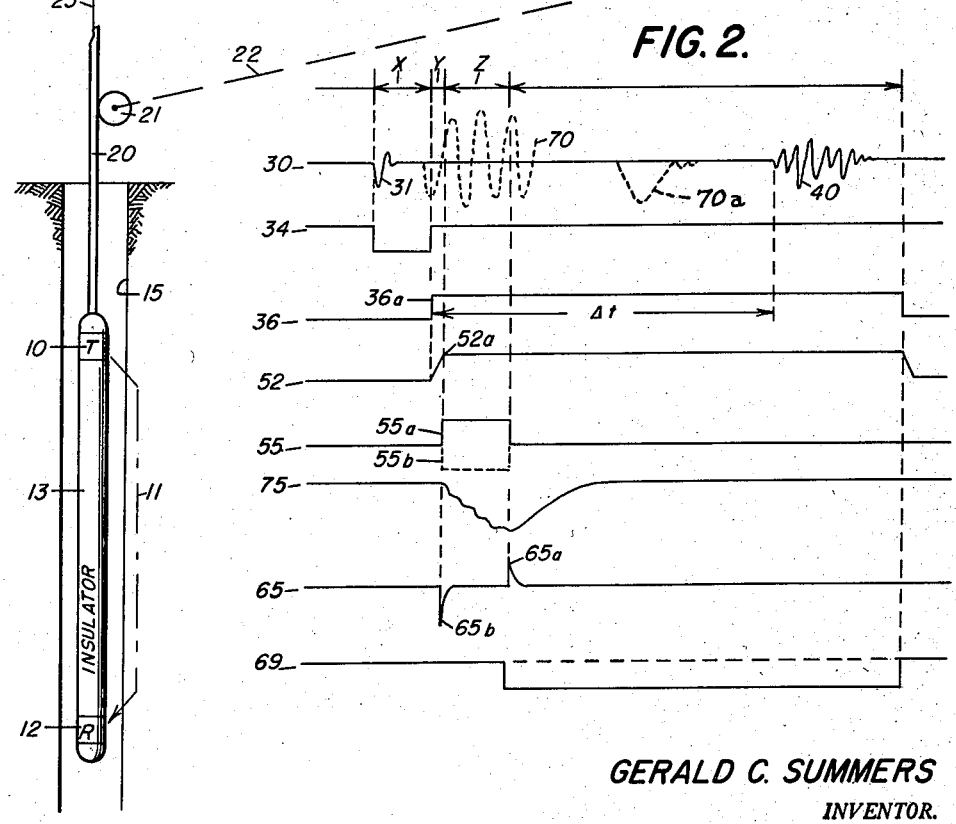
FIG. 1.
FIG. 2.
GERALD C. SUMMERS
INVENTOR.
BY D. Carl Richards
ATTORNEY

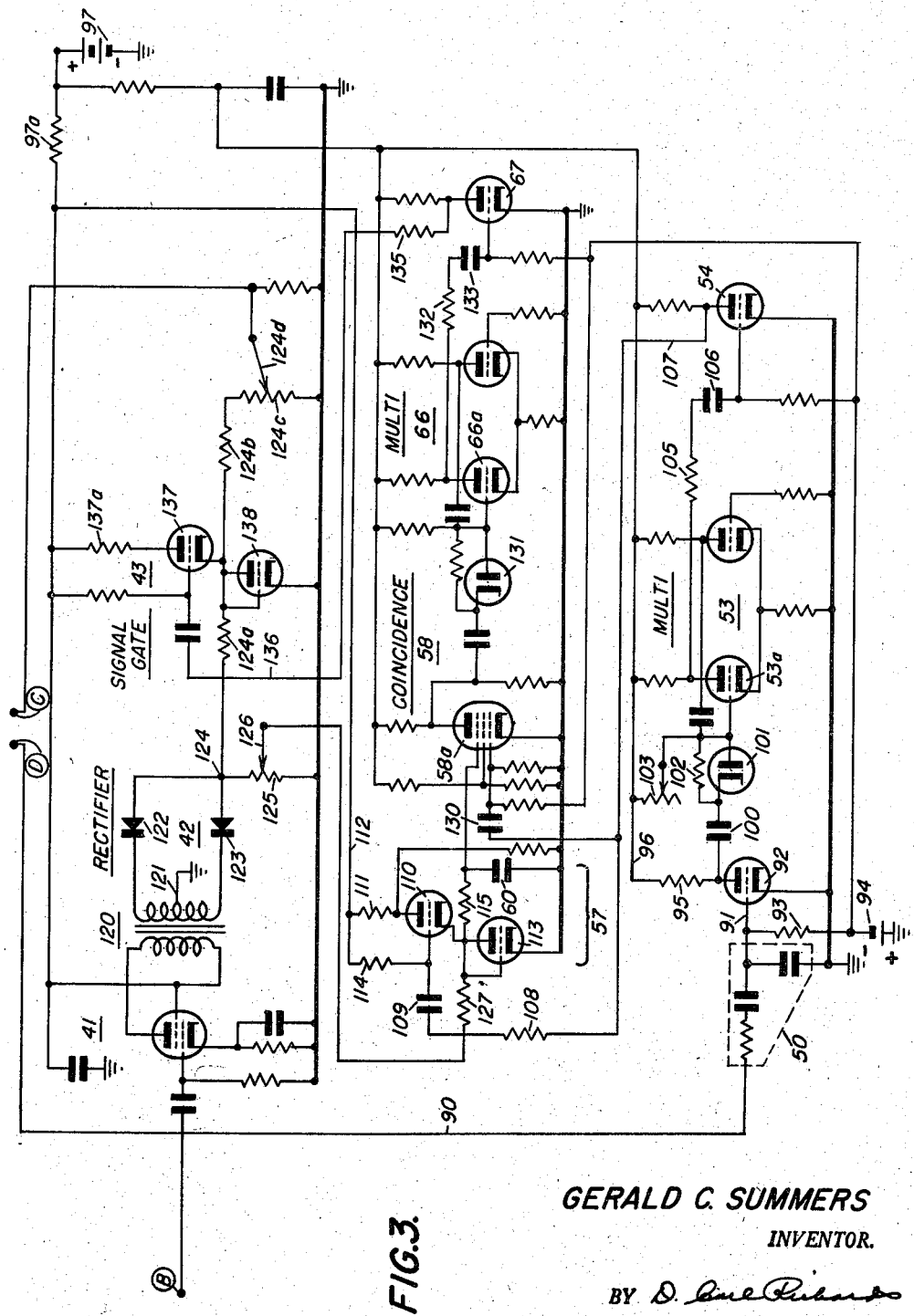

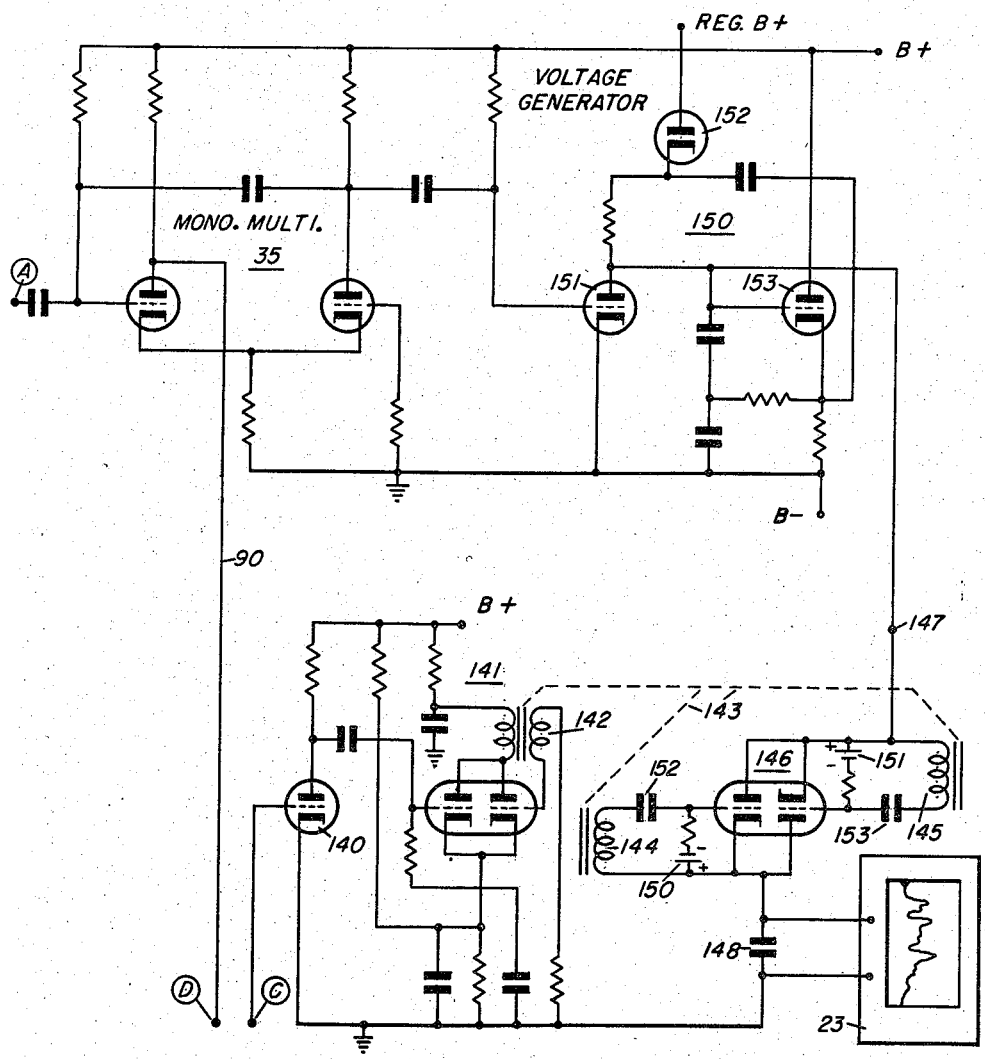
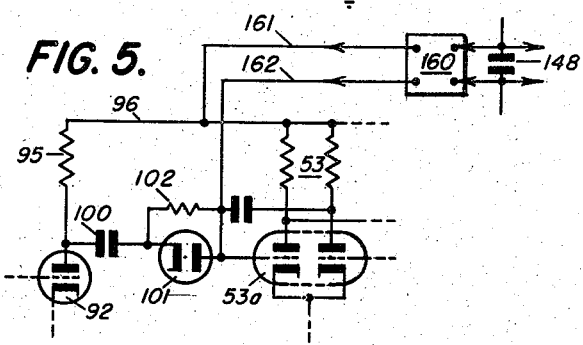
FIG. 5.
FIG. 4.
GERALD C. SUMMERS
INVENTOR.
BY D. Carl Richards
ATTORNEY

NOISE SENSITIVE CONTROL OF ACOUSTIC WELL LOGGING SYSTEMS

Gerald C. Summers, Dallas, Tex., assignor, by mesne assignments, to Socony Mobil Oil Company, Inc., a corporation of New York Application January 20, 1955, Serial No. 482,993

11 Claims. (Cl. 181—.5)

This invention relates to the measurement of acoustic energy in well bores and more particularly to the provision of a method of acoustic logging in which measurements are made dependent only on absence of unwanted noise energy.

Measurement of an acoustic characteristic of earth formations often is hampered by the presence of high amplitude noise energy produced either by the movement of the measuring means through a well bore or by a completely external but uncontrollable noise source. The present invention is designed to permit a measuring program to be carried out as long as such unwanted noise energy is not present and to prevent any measurement of an earth parameter in the time intervals in which the noise energy is present.

While the invention may be applicable to measurement of the acoustic attenuation of earth formations through systems such as described in Patent No. 2,691,422, the present description will pertain principally to the use of the present invention in connection with acoustic velocity well logging employing systems such as shown in applicant's Patents No. 2,704,364 and No. 2,768,701.

The systems of the above applications are operated such that a transmitter 10, Fig. 1, repeatedly produces a sharp acoustic pulse which travels along a path generally indicated by the broken line 11 to a receiver 12 which is spaced and supported from the transmitter 10 by an insulator 13. Coincident with the transmission of each pulse from the transmitter 10 there is produced a unidirectional voltage which linearly increases as a function of time in the interval between each pair of pulses. Upon receipt of the first acoustic energy by receiver 12 following generation of each acoustic pulse, the magnitude of the unidirectional voltage is sampled. A charge is then stored on a capacitor which is proportional to the magnitude of the voltage.

In another modification of the invention such as shown in application Serial No. 370,376 of Robert A. Broding, John O. Ely and Gerald C. Summers, a train or series of uniformly spaced pulses is generated beginning with the transmission of each acoustic pulse and upon receipt of acoustic energy by receiver 12 the pulse generation is effectively terminated wherein the number of such pulses is proportional to the time of travel of the acoustic pulse between the transmitter and receiver.

In either of the systems above-described the presence of random noise in the interval following production of an acoustic pulse by transmitter 10 and the arrival of such pulse at the receiver, the receiver 12 will respond to the noise to cause the sampling of the unidirectional voltage or termination of the generation of the train of pulses much earlier than is possible by travel of acoustic energy through the formations. An extremely high velocity formation is erroneously indicated due entirely to the presence of random noise.

The present invention is directed to an acoustic measurement responsive to arrival of energy at the receiver predicated upon absence of "noise" or unwanted energy in the interval immediately following the generation of each acoustic pulse.

More particularly, in accordance with the present invention there is provided a system for measuring acoustic energy from a sending station in a well bore upon arrival at a receiving station in the well bore wherein erroneous measurements due to the presence of extraneous noise are eliminated through a signal controlling means in a circuit leading to a measuring means and wherein a means responsive to noise energy in the interval following generation of each acoustic pulse and prior to the arrival of acoustic pulses at the receiving station actuates the control means to prevent transmission of any signal in the circuit to the measuring means when noise energy is present.

For a more complete understanding of the present invention and for further objects and advantages thereof, reference may now be had to the following description taken in conjunction with the accompanying drawings in which:

Fig. 1 is a block diagram including the present invention;

Fig. 2 is a time plot representative of signals in the system of Fig. 1;

Fig. 3 is a schematic diagram of a noise sampling circuit;

Fig. 4 is a schematic diagram of a voltage generator and time scaler system; and Fig. 5 is a diagram of a modification of the invention.

Referring now to Fig. 1, a cable 20 is connected at its lower end to the borehole instrument comprising elements 10, 12 and 13 and adapted to support the borehole instrument for movement along the length of the hole 15. A depth sensing element such as a pulley 21 in contact with the cable 20 mechanically is coupled by way of the broken line 22 to a recorder 23. A recorder chart 24 is in this manner driven such that its length is proportional to the depth of the borehole instrument or exploring unit.

Signals in the form of electrical transients or pulses from the exploring unit are transmitted to the earth's surface by way of signal channels represented by the line 25.

An initial signal plotted on line 30, Fig. 2, characterized by a pulse 31 generated coincident with the generation of an acoustic pulse at a sending station by transmitter or transducer 10, is transmitted up over channel 25 and by way of amplifier 32 to a time delay network 33. Time delay network 33 may be a monostable multivibrator of the type well known by those skilled in the art. The delay network is arranged as to produce an output pulse a preselected interval after actuation by pulse 31. More particularly, as shown on line 34, Fig. 2, a rectangular control signal is produced by time delay 33 for control of a monostable multivibrator 35.

The monostable multivibrator 35 is a relatively long time constant circuit whose output is illustrated by the waveform 36. The voltage of waveform 36 is applied by way of channel 37 to a time scaler 38 to initiate in the time scaler 38, as will hereinafter be described, the generation of a function which varies linearly following the instant of the sharp rise 36a of waveform 36. The prime function of the measuring system is to register on recorder 23 an indication of the magnitude of the time interval $\Delta t$ shown superimposed on the waveform 36. The end of the $\Delta t$ period is marked by the arrival at a receiving station and more particularly at receiver 12 of an acoustic pulse 40 shown on line 30. The transient pulse 40 is the output of receiver or transducer 12 as transmitted to the earth's surface over channel 25 and applied to amplifier 41.

If noise is not present in the system 10, 12, and 13, then the pulse 40, highly amplified in amplifier 41, is passed through full wave rectifier 42 and a signal gate 43 and thence by way of channel 44 to the time scaler 38. The appearance of the first component of pulse 40 causes the time scaler to register on recorder 24 an indication of the time interval Δt.

The remaining components of the system of Fig. 1 co-act with the system above described to prevent measurement of Δt if in the interval immediately following the abrupt rise 36a of waveform 36 extraneous noise signals are present in the system.

To this end the voltage from monostable multivibrator 35 is applied by way of an integrating network 50 to a trigger amplifier 51 which is normally biased to cutoff. The integrating network 50 changes the onset of waveform 36 from a step function to a ramp function as shown by waveform 52. When the trigger amplifier 51 begins to conduct as at point 52a, a voltage pulse is produced by differentiation of the waveform 52 which triggers a multivibrator 53. The output of multivibrator 53 is amplified and shaped in shaper 54. The voltage applied to shaper 54 is on line 55 represented by the rectangular wave 55a. The output of shaper 54 is a rectangular pulse 55b of negative polarity.

Pulse 55b, applied by way of channel 56 to a normally closed noise gate circuit, opens gate 57 for the duration of the pulse 55b. Gate 57 is coupled to a coincidence circuit 58.

The output of shaper 54 is also applied to a differentiator 61 whose output in the form of pulses 65a and 65b shown on line 65, is applied to the coincidence circuit 58. In the absence of noise the pulse 65a actuates a multivibrator 66 whose output in turn controls shaper 67. The output of shaper 67 is then applied by way of channel 68 to the signal gate 43 to permit the transient 40 (rectified) to pass therethrough to the time scaler 38. The output of shaper 67 is shown as waveform 69.

In the interval between pulses 65b and 65a noise energy such as represented by the dotted transient 70, Fig. 2, may appear in the output from receiver 12. Full wave rectifier 42 applies a voltage representative of the rectifier noise energy through noise gate 57 to an integrator represented by condenser 60. The resultant voltage built up on condenser 60 is illustrated on line 75 and being negative in polarity with respect to ground, biases coincidence circuit 58 to cutoff. This action prevents the pulse 65a from actuating multivibrator 66. Thus if noise is present, the signal gate 43 will not be opened by the gating pulse of waveform 69.

The generation of each acoustic pulse by transmitter 10 is followed by a series of operations such that the noise level of the output from receiver 12 is sampled and if the noise is found to be low or non-existent, the system will be permitted to perform a measurement. If the receiver output is noisy, the system will be prevented from making a measurement.

The system for performing the functions above described is illustrated in the detailed circuit diagrams of Figs. 3 and 4 which are to be taken together. In Fig. 4 the terminal labelled A is the point intermediate time delay unit 33 and monostable multivibrator 35 of Fig. 1. In Fig. 4 point B is the same as terminal B of Fig. 1. With terminals A and B as starting points, the function of the system of Figs. 3 and 4 will now be described employing the same reference characters as in Fig. 1.

Monostable multivibrator 35 is actuated by a pulse produced at the trailing edge of waveform 34. The output from the first tube of the monostable multivibrator 35 is applied by way of conductor 90 to terminal D, and thence to the integrating circuit 50 (Fig. 3). The output of integrating circuit 50 is applied by way of conductor 91 to the control grid of a triode 92. The cathode of triode 92 is connected directly to ground.

The grid of triode 92 is connected by way of resistor 93 and biasing battery 94 to ground. Biasing battery 94 maintains tube 92 normally cut off. The anode of tube 92 is connected by way of load resistor 95 to a B+ bus 96 which is connected to a suitable battery such as battery 97. A voltage of waveform 52, Fig. 2, is thus applied to the grid of tube 92 rendering it conductive a time interval Y, Fig. 2, after the abrupt voltage rise 36a.

The anode of tube 92 is connected by way of condenser 100 through diode 101 to the control grid of the first stage of the multivibrator 53. The diode 101 is connected to condenser 100 at its cathode and to the input of multivibrator 53 at its anode. A resistor 102 is connected across the diode 101. The grid of tube 53a and the anode of diode 101 are connected by way of variable resistor 103 to B+ bus 96. The negative pulse at the anode of tube 92 coupled through condenser 100 and diode 101 actuates the multivibrator 53 to generate a rectangular voltage 55a, Fig. 2, at the anode of the input stage of tube 53a. This voltage, positive in sign and rectangular in form, is transmitted by way of the R.-C. network 105 and 106 to the grid of a shaper stage. The length or duration of pulse 55a is controlled by varying resistor 103 to change the magnitude of voltage applied from the B+ bus 96 to the grid of tube 53a. An operator may by this means select the length of the period in which for control purposes the system will be sensitive to noise.

The output of shaper 54 is a negative rectangular pulse 55b. The latter pulse is transmitted from the anode of shaper 54 by way of conductor 107, resistor 108 and condenser 109 to the control terminal of the noise gate circuit 57. More particularly, one terminal of condenser 109 is connected to the control grid of a triode 110 whose anode is connected by way of resistor 111 to a B+ bus 112 and whose cathode is connected to the anode of a second triode 113 whose cathode in turn is connected to ground.

The control grid of tube 113 is connected directly to the anode thereof so that it operates as a diode. The B+ bus 112 is connected by way of resistor 114 to the control grid of tube 110. The juncture between tubes 110 and 113 is connected by way of resistor 115 to the suppressor grid of a pentode 58a in the coincidence circuit 58. The condenser 60 of Fig. 1 is shown in Fig. 3 connected between the suppressor grid of pentode 58a and ground.

In operation triode 110 normally is highly conductive so that the tube 113 offers little, if any, impedance thus shunting the control signal path. The control signal path may be traced from terminal B, through the amplifier stage 41, which includes a tetrode having a transformer coupled output circuit. The transformer 120 is connected at the center tap 121 of its secondary winding to ground. Two diodes 122 and 123 are connected in series opposition with the extremities of the secondary winding of transformer 120. The common juncture 124 between diodes 122 and 123 is connected to ground through impedance 125. An adjustable tap 126 on resistor 125 forming a part of the control signal path is connected by way of resistor 127 to the common terminal between tubes 110 and 113. When tube 110 is conducting, the suppressor grid of tube 58a is maintained at ground potential by tube 113. However, when the signal from the shaper circuit 54 is applied to the grid of tube 110, conduction therethrough is terminated and diode 113 becomes a high impedance, thereby permitting transmission of signals from the tap 126 to the suppressor grid of tube 58a. The diodes 122 and 123 serve to produce a full-wave-rectified counterpart of the signal applied to terminal B in the interval Z, Fig. 2. This rectified signal, negative in sense with respect to ground, charges condenser 60 negative stepwise in the manner illustrated by the waveform 75, Fig. 2.

It is to be noted that the control grid of pentode 58a is connected to battery 94 to bias it normally not to conduct. In the event of absence of noise signals in the time interval Z the suppressor grid of tube 58a is without bias so that the coincidence circuit 58 is conditioned to conduct. When this is the case, the positive pulse 65a, Fig. 2, transmitted to the control grid of tube 58a by way of condenser 130 overcomes the negative bias on the control grid and causes tube 58a to conduct and a pulse is transmitted by way of a diode 131 to the multivibrator 66. The circuit connected to diode 131 is similar in its operation to that above described in connection with tube 101.

Multivibrator 66 then produces at the anode of the tube 66a a positive rectangular pulse of duration equal that of pulse 69. The signal from tube 66a is applied by way of resistor 132 and condenser 133 to the grid of a shaper and inverter stage 67. A positive voltage of form 69, Fig. 2, is then applied by way of resistor 135 and conductor 136 to the control grid of a signal gate circuit 43 which includes triode 137 and diode connected triode 138 which operate in the same manner as the circuits of tubes 110 and 113 above described.

If a noise voltage in the interval Z has not charged condenser 60, then a voltage of the wave shape 69, Fig. 2, is applied to the control grid of triode 137 cutting the latter triode off so that diode-connected triode 138 presents a high impedance. A signal appearing at point 124 following the occurrence of pulse 65a may now be transmitted to terminal C. If the voltage wave 69 is not generated for application to the grid of tube 137, then tube 137 conducts with a relatively high current flowing from battery 97 through resistor 97a and plate resistor 137a, triode 137 and diode 138. The diode 138 is connected at the anode thereof to point 124 by way of a high impedance such as resistor 124a and through high impedances such as resistors 124b and 124c to variable tap 124d associated with resistor 124c which in turn is connected to the output terminal C. Impedances 124a and 124b are relatively high compared to the impedance of diode 138 so that a large current flow through tubes 137 and 138 serves effectively to shunt to ground those signals transmitted from point 124 to the juncture between resistors 124a and 124b and makes impossible any appreciable change in voltage across resistor 124c due to the currents produced by the signal at point 124. However when tube 137 is cut off as by wave form 69, tube 138 is nonconducting and minute currents produced by the signal at point 124 will produce corresponding voltages across resistor 124c. Since the signal is rectified and only negative components thereof appear at point 124, such components can pass diode 138 only when triode 137 is cut off. Thus there is provided a reliable conductivity control element for the signal channel which introduces little, if any, transient when switching from a conductive to a non-conductive condition.

It is to be noted that terminal C is connected in Fig. 4 to the input of an amplifier including triode 140 whose output is connected to the input grid of a blocking oscillator 141. Blocking oscillator 141, upon receipt of a signal corresponding with the transient 40, Fig. 2, produces in its output transformer 142, as understood by those skilled in the art, essentially a single cycle voltage pulse of very short period. The latter voltage also is inductively coupled through a common magnetic core (indicated by the dotted lines 143) to transformer windings 144 and 145 to control the conduction of a bilaterally conductive clamp circuit 146. Within the duration of the pulse from the blocking oscillator 141, any voltage appearing on conductor 147 will cause current to flow through the triode clamp 146 to charge condenser 148 proportional to the magnitude of that voltage at that instant.

In accordance with applicant's above-noted Patent No. 2,704,364 the voltage on conductor 147 is a linearly increasing voltage repeatedly generated beginning at a zero voltage level at a time coincident with the abrupt rise 36a, Fig. 2. More particularly, the voltage shown on line 36 is applied to the control grid of a linear voltage generator 150 which includes an input triode 151, a diode 152 and a triode 153 together with associated circuit elements. The operation of voltage generator 150 and its controlling multivibrator 35 is described in the M. I. T. text "Waveforms" beginning at page 276 and basically is the same as that illustrated at page 277, Fig. 7.23, modified as to have time constants suitable for time sequences involved in acoustic logging. In accordance therewith a linearly increasing voltage appears at the anode of tube 151. Thus there is produced on condenser 148 a voltage proportional to the travel time of acoustic pulses in the formations between transmitter 10 and receiver 12, Fig. 1.

It is to be noted that the time interval X, Fig. 2, is adjusted, in accordance with applicant's Patent No. 2,768,701, as to be equal to the travel time of an acoustic pulse through the fluids separating transmitter 10 and receiver 12 from the adjacent formations plus the time lag inherent in instrumentation. Thus the voltage on condenser 148 is applied to recorder 23, which preferably has a high input impedance, and is representative of the time interval $\Delta t$, Fig. 2. So long as the clamp 146 remains at high impedance or non-conductive the voltage on condenser 148 remains substantially constant.

Assume now that in the interval Z the high amplitude unwanted noise signal 70, Fig. 2, is present. Rectifier 42 applies a signal to the condenser 60 to charge it as represented by line 75, Fig. 2. This renders the suppressor grid of the coincidence circuit 58 highly negative blocking the pentode 58a. Thus when pulse 65a, Fig. 2, is produced, it finds the pentode 58a blocked and prevents the multivibrator 66 from opening the signal gate 43. So long as noise energy is present immediately following the generation of each successive acoustic pulse, the entire time scaling system will remain unchanged and any voltage previously obtained by condenser 148 will be exhibited on the recorder 23. When the noise condition is such that the voltage on condenser 60 is allowed to disappear, a subsequent pulse, pulse 65, will permit the signal gate 43 to resume its normal operation.

Bias batteries 150 and 151 maintain proper bias on condensers 152 and 153 when several pulsing cycles go by without a sampling action.

The operation above described deals specifically with the problem of noise of a periodic nature such as illustrated by the wave 70, Fig. 2. In order to eliminate erroneous measurements due to the presence of sustained waves, the length of the pulse 55a may be made relatively short, it being necessary only that noise be sampled any time prior to the arrival of pulse 40. However, if a sharp intermittent burst of energy of a non-periodic nature such as waveform 70a were generated, then in spite of the measures above described an erroneous measurement would be obtained. It may therefore be desirable to increase the length of pulse 55b by varying the control resistor 103, Fig. 3, which changes the grid bias on the input tube 53a of the multivibrator thereby to vary the length of time the multivibrator 53 remains in an unstable condition after having been triggered. More particularly, resistor 103 may be adjusted so that pulse 65a occurs immediately prior to the arrival of pulse 40 or just before the end of the interval $\Delta t$. Thus any noise energy would render the system insensitive for measuring purposes.

In accordance with another modification of the invention, the signal on condenser 148 may itself be employed to control the length of the multivibrator period 55a. Such a system has been shown in Fig. 5 which is a fragmentary diagram of portions of Fig. 3 and wherein the same reference characters have been employed as in Fig. 3 to designate like parts. More particularly, the voltage across condenser 148 is applied to an isolating network 160 whose output circuit in turn is connected by way of conductors 161 and 162 to the B+ bus 96 and the grid of the input tube 53a, respectively. The voltage on the grid is negative with respect to that on bus 96 and serves the same purpose as the voltage applied to the grid through resistor 103 (Fig. 3). However, by deriving such voltage from condenser 148 which is always charged in proportion to the time $\Delta t$, the noise control network may be made sensitive to noise during the maximum possible period. For this type operation it would only be necessary to limit the maximum length of pulse 55a relative to the time interval $\Delta t$ to a value less than the maximum contrast possible in formation velocities encountered in the section of earth to be logged. This would prevent a failure in operation in passing from an extremely low velocity formation to a high velocity formation.

Having described the invention in connection with certain modifications thereof, it will now be understood that further modifications may now suggest themselves to those skilled in the art and it is intended to cover such modifications as fall within the scope of the appended claims.

What is claimed is:

1. In an acoustic well logging system in which measurements are to be representative of the time required for time-spaced acoustic pulses to travel over a section of borehole intermediate a pair of transducers which are movably supported in said borehole, the combination which comprises a signal measuring circuit, a signal channel interconnecting a first of said transducers and said measuring circuit and adapted to be selectively opened or closed, and means connected to said signal channel and to the second of said transducers responsive only to signals appearing in said signal channel in a restricted time interval immediately following the appearance of each of said acoustic pulses at the second of said transducers and adapted to maintain said signal channel in a non-transmitting condition in response to such signals and to maintain said signal channel in a transmitting condition in the absence of such signals whereby measurements will be made in response to the arrival of each of said acoustic pulses at the first of said transducers only when signals are not present during said restricted time interval.

2. In a well logging system having a means to measure the time interval between the generation of an acoustic pulse at a sending station in a well bore and the arrival of said pulse at a receiving station in said well bore, the combination therewith for eliminating erroneous measurements due to the presence of extraneous noise which comprises a signal circuit leading from said receiving station to the measuring means, signal control means in said signal circuit and means responsive to noise energy in said circuit in the interval following generation of each of said pulses and prior to the arrival of said pulses at said receiving station for actuating said signal control means to prevent transmission of any signal in said circuit to said measuring means.

3. In a well logging system having a means to measure the time intervals between the generation of each of a series of acoustic pulses at a sending station in a well bore and the arrival of said pulses at a receiving station in said well bore, the combination therewith for eliminating erroneous measurements resulting from the presence of extraneous noise which comprises a signal circuit leading from said receiving station to the measuring means, a conductivity control element in said signal circuit, and means connected to said conductivity control element and responsive to signals in said signal circuit in the intervals following generation of each of said pulses and prior to the arrival of said pulses at said receiving station for rendering said circuit non-conductive.

4. In a well logging system having a means to measure the time interval between the generation of an acoustic pulse and the arrival of said pulse at a receiving station in a well bore, the combination therewith which comprises a signal channel interconnecting said receiving station and the measuring means, means for blocking said channel, a control system for the blocking means connected to the input of said channel for sensing noise in said channel in a sampling interval between said generation and arrival of said pulse, means for applying a short pulse to said control system for unblocking said channel at the end of said sampling interval, and means for preventing transmission of said short pulse through said control means when noise occurs at said input within said interval.

5. The combination set forth in claim 4 in which means independently variable are provided in said control system for adjustment of the length of said sampling interval.

6. The system set forth in claim 4 in which the length of said sampling interval is automatically adjustable as to be a predetermined fraction of said time interval.

7. In a well logging system having a measuring means for measuring the time interval between the generation of an acoustic pulse at a sending station in a well bore and the arrival of said pulse at a receiving station in said well bore, the combination therewith which comprises a signal channel leading from said receiving station to said measuring means and including a pair of conductors with means for rectifying the signals from said receiving station to produce a unidirectional voltage in said channel and a pair of high impedances connected in series between said rectifying means and said measuring means, an asymmetrically conductive element connected across said conductors at a point intermediate said impedances, means including a source of direct current connected to said intermediate point for establishing relatively high current flow through said asymmetrical element to prevent transmission of said unidirectional voltage to said measuring means, and means connected to said signal channel for interrupting said current flow only in the absence of noise energy from said receiving station in the time interval between generation of each said acoustic pulse and the arrival of said pulse at said receiving station.

8. In a well logging system having a measuring means for measuring the time interval between the generation of an acoustic pulse at a sending station in a well bore and the arrival of said pulse at a receiving station in said well bore, the combination therewith which comprises a signal channel leading from said receiving station and including means for rectifying the signals from said receiving station to produce unidirectional pulses corresponding in time with said signals, means including two conductors leading from said rectifier to said measuring means and including a pair of high impedances connected in series with one of the conductors, a diode connected between said two conductors from a point intermediate said high impedances, means including a source of direct current connected to said diode for establishing relatively high current flow through said diode thereby to prevent transmission of unidirectional pulses on said conductors to said measuring means, and means connected to said signal channel and responsive to noise signals thereon in the time interval between generation of each said acoustic pulse and the arrival of said pulse at said receiving station and adapted to interrupt said current flow only when said noise signals are below a predetermined level.

9. In a well logging system having a measuring means for measuring the time interval between the generation of an acoustic pulse at a sending station in a well bore and the arrival of said pulse at a receiving station in said well bore, the combination therewith which comprises a signal channel leading from said receiving station and including means for rectifying the signals from said receiving station to produce unidirectional pulses corresponding in time with said signals, means including two conductors leading from said rectifier to said measuring means and including a pair of high impedances connected in series with one of the conductors, a diode connected between said two conductors from a point intermediate said high impedances, a source of direct current and variable impedance means connected in series with said diode with said variable impedance means normally at a relatively low impedance level for establishing relatively high current flow through said diode to prevent transmission of unidirectional pulses on said conductors to said measuring means, and means connected to said signal channel and responsive to noise signals thereon in the time interval between generation of said acoustic pulse and the arrival of said pulse at said receiving station for changing said variable impedance to a high level to terminate said current flow only when said noise signals are below a predetermined level.

10. In a well logging system having means for measuring the time interval between a first electrical transient produced in a predetermined time relation with the generation of an acoustic pulse at a sending station in a well bore and a second electrical transient produced coincident with the arrival of said acoustic pulse at a receiving station in said well bore, the combination therewith comprises a signal channel for said second transient which includes a rectifier for producing a unidirectional pulse from said second transient, two relatively high impedance resistors connected between said rectifier and the measuring means, a variable impedance connected between ground and a point intermediate said resistors selectively to shunt said unidirectional pulse to ground, and a circuit for controlling said variable impedance having two inputs one of which is connected to the output of said rectifier and the other connected to the source of said first transient and including means for abruptly changing said impedance at the end of a predetermined time interval following said first transient only if the output from said rectifier in said predetermined time interval is below a predetermined level.

11. In an acoustic well logging system in which measurements are to be made periodically in response to signals representative of and produced from time-spaced acoustic pulses traveling over the section of the borehole intermediate a pair of transducers which are movably supported in said borehole, the combination therewith which comprises (1) a signal measuring circuit, (2) a signal channel interconnecting a first of said transducers and said measuring circuit, (3) a control circuit which in a first condition permits signal transmission through said signal channel to said measuring circuit and in a second condition prevents signal transmission through said signal channel to said measuring circuit, and (4) means interconnecting said control circuit and one of said transducers and adapted to maintain said control circuit in the second of said conditions in response to a signal from the last named transducer in the time interval immediately prior to the arrival of each of said acoustic pulses at the first of said transducers.

References Cited in the file of this patent

UNITED STATES PATENTS

| | | |
|---|---|---|
| 2,275,736 | Cloud | Mar. 10, 1942 |
| 2,651,027 | Vogel | Sept. 1, 1953 |